United States Patent
Basalamah et al.

(10) Patent No.: US 9,418,531 B2
(45) Date of Patent: Aug. 16, 2016

(54) SYSTEM AND METHOD FOR TRACKING PEOPLE

(71) Applicant: UMM AL-QURA UNIVERSITY, Makkah (SA)

(72) Inventors: Anas Basalamah, Makkah (SA); Shuja Jamil, Makkah (SA); Saleh Basalamah, Makkah (SA)

(73) Assignee: Umm Al-Qura University, Makkah (SA)

( * ) Notice: Subject to any disclaimer, the term of this patent is extended or adjusted under 35 U.S.C. 154(b) by 70 days.

(21) Appl. No.: 14/387,973

(22) PCT Filed: Sep. 11, 2014

(86) PCT No.: PCT/IB2014/001812
§ 371 (c)(1),
(2) Date: Sep. 25, 2014

(87) PCT Pub. No.: WO2016/038405
PCT Pub. Date: Mar. 17, 2016

(65) Prior Publication Data
US 2016/0078738 A1   Mar. 17, 2016

(51) Int. Cl.
*G08B 21/02* (2006.01)
*G06K 7/10* (2006.01)
*H04L 29/12* (2006.01)
(Continued)

(52) U.S. Cl.
CPC .......... *G08B 21/0277* (2013.01); *G01S 5/0284* (2013.01); *G06K 7/10366* (2013.01); *G08B 21/0269* (2013.01); *H04L 61/35* (2013.01); *H04L 67/18* (2013.01); *H04W 4/008* (2013.01);
(Continued)

(58) Field of Classification Search
CPC ....... H04W 4/02; H04W 64/00; H04W 4/021; H04W 4/023; H04W 4/028; H04W 12/08; H04W 4/027; H04W 24/00
USPC .......................................................... 340/8.1
See application file for complete search history.

(56) References Cited

U.S. PATENT DOCUMENTS

| | | | |
|---|---|---|---|
| 6,344,794 B1 * | 2/2002 | Ulrich ................ | G06K 17/0022 340/539.13 |
| 6,714,121 B1 * | 3/2004 | Moore ............... | G06K 7/10336 340/10.3 |

(Continued)

OTHER PUBLICATIONS

Wang, S., "The design and implementation of a smartphone and Bluetooth-based criminal tracking system", URL: http://lib.dr.iastate.edu/cgi/viewcontent.cgi?article=4619&context=etd, pp. 1-45, (2013).

(Continued)

*Primary Examiner* — Mark Blouin
(74) *Attorney, Agent, or Firm* — Oblon, McClelland, Maier & Neustadt, L.L.P.

(57) ABSTRACT

The present invention relates to receiving information of detected wireless electronic tags, comparing the received information to information stored in the server, and updating the information stored in the server based on the received information. Further, the invention relates to receiving a request regarding location information of an electronic wireless tag, determining whether identification information regarding the electronic wireless tag is available, and transmitting the identification information regarding the electronic wireless tag in response to the request regarding location information after determining that the identification information is available.

20 Claims, 7 Drawing Sheets

(51) Int. Cl.
  *H04L 29/08* (2006.01)
  *G01S 5/02* (2010.01)
  *H04W 4/02* (2009.01)
  *H04W 4/00* (2009.01)

(52) U.S. Cl.
  CPC .............. *H04W 4/023* (2013.01); *H04W 4/025* (2013.01); *H04W 4/028* (2013.01)

(56) References Cited

U.S. PATENT DOCUMENTS

| | | | |
|---|---|---|---|
| 8,604,925 B2 | 12/2013 | Monte et al. | |
| 2004/0036623 A1* | 2/2004 | Chung | G06K 7/10336 340/8.1 |
| 2013/0099920 A1 | 4/2013 | Song et al. | |
| 2013/0217332 A1* | 8/2013 | Altman | H04H 60/90 455/41.2 |
| 2014/0051461 A1 | 2/2014 | Ranki et al. | |
| 2014/0213301 A1 | 7/2014 | Evans et al. | |

OTHER PUBLICATIONS

Quuppa Oy, "Makes High Accuracy Indoor Positioning commercially available", URL: http://www.in-location-alliance.com/files/ILA/ILA_Munich_Quuppa.pdf, pp. 1-30, (Nov. 2013).

Indiegogo, "StickNFind-Bluetooth Powered ultra small Location Stickers", URL: http://www.sticknfind.com/sticknfind.aspx?scrollTo=1850, Total 1 Page, (Apr. 30, 2014).

Tag, G., "Gecko Bluetooth Smart Tag Multi-function Smartphone and Tablet Enhancer and Enabler, GT101", URL: http://www.amazon.com/Gecko-Tao-Multi-function-Smartphone-GT101/dp/B00HJQKSP0#productDetails, pp. 1-5, (Apr. 30, 2014).

International Search Report and Written Opinion issued May 26, 2015 in PCT/IB2014/001812 (submitting English translation only).

* cited by examiner

SYSTEM AND METHOD FOR TRACKING PEOPLE

BACKGROUND

The present disclosure is related to using short-range communication technology between personal devices, such as smartphones, and Bluetooth Low Energy (BLE) tags and long-range communication between personal devices, such as smartphones, and a server, including a database.

During big events (such as religious pilgrimages, sports matches) that include a lot of people, there is a chance that one might get separated from their family or friends. In the event that a child gets separated from a family, it becomes really difficult for the family to find the child in a large crowd causing the family members and the child a lot anguish and frustration.

BLE is a recently developed technology that allows low energy communications with extremely long life cycles. BLE tags can advertise their presence and have a coverage range of around 50 meters. BLE tags are further described in Caries Gomez, Joaquim Oller, Josep Paradells, "Overview and Evaluation of Bluetooth Low Energy: An Emerging Low-Power Wireless Technology," Aug. 29, 2012 and in Julio Villegas, "Bluetooth Low Energy Version 4.0 Helping create the 'internet of things,'" which are incorporated herein by reference.

The "background" description provided herein is for the purpose of generally presenting the context of the disclosure. Work of the presently named inventor, to the extent it is described in this background section, as well as aspects of the description which may not otherwise qualify as prior art at the time of tiling, are neither expressly or impliedly admitted as prior art against the present invention.

SUMMARY

Described herein is a system and method to track people and to send information, including a location of the tracked person. The present invention allows people to be tracked who are moving from one place to another.

A system according to the present invention may use short-range wireless communications such as Bluetooth Low Energy (BLE) tags. Other short range communication technologies such as WiFi, Bluetooth, ultrasonic waves, infrared, near-field communication (NFC), and radio-frequency identification (RFID) may also be used. The examples discussed herein utilize BLE tags, but it should be appreciated that different short-range wireless technologies can replace BLE tags in other implementations. For example, any of the above-listed or other short-range wireless communication technologies can be utilized in other implementations.

An exemplary aspect of this disclosure includes detecting BLE tags, sending information, including location information, regarding the detected BLE tags to a server, and requesting information regarding a particular BLE tag from the server. For example, a smartphone device can detect a plurality of BLE tags within a detectable zone of the smartphone device, send information (including location information) regarding the detected BLE tags to the server, and request information regarding a particular BLE tag from the server.

In another example, a plurality of reading devices affixed at respective locations can be used to detect a plurality of BLE tags within a detectable zone of the plurality of reading devices and send information, including location information, regarding the detected BLE tags to a server. The reading devices may also have the capability to request information (including location information) regarding a particular BLE tag from the server.

These exemplary aspects can be embodied in corresponding methods, devices, computer-readable media, hardware circuitry, and in computer program code executed by processing circuitry, as will be appreciated in view of the following detailed description.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The foregoing paragraphs have been provided by way of general introduction, and are not intended to limit the scope of the following claims. The described implementations, together with further advantages, will be best understood by reference to the following detailed description taken in conjunction with the accompanying drawings.

An exemplary system according to the present disclosure includes a smartphone device, a tablet, a smart watch, a laptop, or a similar device. Additionally, the exemplary system according to this disclosure also includes a server, a BLE tag, a network, and a database or equivalents thereof.

Figure 1:
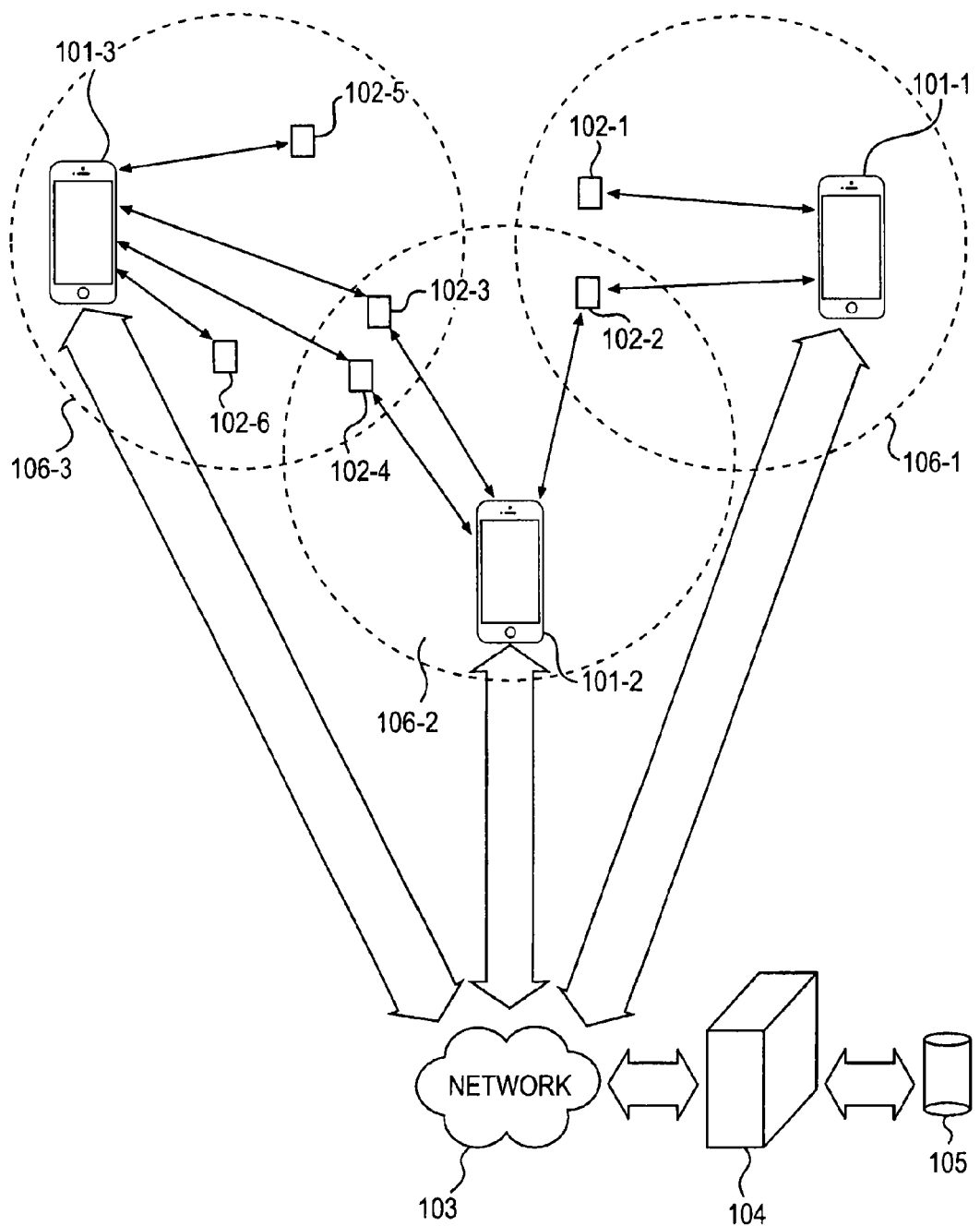
FIG. 1 illustrates communication between a plurality of BLE tags and a plurality of smartphone devices and between a plurality of smartphone devices and a server according to one example.

FIG. 1 is a non-limiting embodiment example that illustrates a plurality of smartphone devices 101-1, 101-2, and 101-3, a plurality of BLE tags 102-1, 102-2, 102-3, 102-4, 102-5, and 102-6, a network 103, a server 104, and a database 105. It should be noted that any other short-range wireless communication may be used instead of BLE tags and that tablets, smart watches, laptops, or a similar device may be used instead of a smartphone device. Additionally, although the example in FIG. 1 illustrates only one server 104 and one database 105, it should be understood that multiple servers and multiple databases may be used. Also, although FIG. 1 illustrates certain BLE tags within a detectable range of a smartphone device, it should be noted that the BLE tags within a particular detectable range of a smartphone device constantly change based on the movement of smartphone device and the BLE tags.

BLE is a technology that allows low energy communications with extremely long life cycles. It can be packaged in small form factor BLE tags 102-1, 102-2, 102-3, 102-4, 102-5, and 102-6 that can be given to people to carry around. Each of these BLE tags 102-1, 102-2, 102-3, 102-4, 102-5, and 102-6 has the ability to advertise its presence by transmitting advertisement packets at predetermined time intervals. The predetermined time intervals may be pre-defined using the BLE standard (e.g., once per second) or can be set by a user. For example, if members of a family decide to go on a religious pilgrimage, the family may set the predetermined time interval of each of the BLE tags 102-1, 102-2, 102-3, 102-4, 102-5, and 102-6 (each BLE tag may correspond to each family member) to advertise itself more frequently compared to when the family is at home. Accordingly, allowing a user to selectively adjust a time interval of advertisement of a BLE tag, the user may be able to extend the life of a BLE tag.

Further, FIG. 1 illustrates a plurality of smartphones devices 101-1, 101-2, and 101-3 which may be equipped with an application directed to detecting advertisement packets of the plurality of BLE tags 102-1, 102-2, 102-3, 102-4, 102-5, and 102-6. The application can be downloaded from the server 104 (or a different server) when a user of a smartphone device registers for a service for locating people according to exemplary embodiments of the present invention. A user of a smartphone device has the ability to turn on/off the application to detect the advertisement packets from the plurality of BLE tags 102-1, 102-2, 102-3, 102-4, 102-5, and 102-6. Typically, each smartphone device has a receiver that can detect BLE tags within approximately a 50 meter radius from the smartphone device (i.e., each BLE tag has a coverage range of around 50 meters). In other words, if a smartphone device detects an advertisement packet from a BLE tag, it is likely that the BLE tag is within approximately a 50 meter radius from the smartphone device. The receiver of a smartphone device can use Bluetooth or any other technology that is known to one of ordinary skill in the art to detect advertisement packets of BLE tags. It should be noted that a detectable zone of a smartphone device in the exemplary embodiments of the present invention corresponds to a maximum distance a BLE tag can transmit an advertisement packet.

In a non-liming embodiment of the present invention, smartphone devices 101-1, 101-2, and 101-3 can detect a plurality of BLE tags 102-1, 102-2, 102-3, 102-4, 102-5, and 102-6 within a detectable zone (such as within approximately 50 meters of the smartphone devices 101-1, 101-2, and 101-3) and store a Media Access Control (MAC) address corresponding to each of the detected BLE tags 102-1, 102-2, 102-3, 102-4, 102-5, and 102-6. The dotted lines 106-1, 106-2, and 106-3 correspond to the detectable zones of each of the plurality of smartphone devices 101-1, 101-2, and 101-3, respectively.

In a non-limiting embodiment, each advertisement packet of a BLE tag 102-1, for example, contains a MAC address, which is a unique identifier that is used to identify the BLE tag 102-1. A smartphone device 101-1, for example, has the capability to identify the MAC address from an advertisement packet of the BLE tag 102-1 and store the MAC address temporarily within its memory when BLE tag 102-1 is detected within a detectable zone of the smartphone device 101-1.

In addition to being able to detect advertisements packets of BLE tags, a smartphone device can detect a location of the BLE tags using any form of localization such as Global Positioning System (GPS) or using trilateration and triangulation methods. If a BLE tag is detected by 3 or more smartphone devices, the location of the BLE tag can be determined using trilateration and triangulation methods. For example, in FIG. 1, when BLE tags 102-1 and 102-2 are detected and stored by the smartphone device 101-1, the smartphone device 101-1 also detects and stores a corresponding location of the BLE tags 102-1 and 102-2. Note that the location of the BLE tags 102-1 and 102-2 stored in the smartphone device 101-1, for example, is the location of the smartphone device 101-1. It should be understood that the actual location of the BLE tags 102-1 and 102-2 are within approximately a 50 meter radius (i.e., the detectable range of the smartphone device 101-1) from the location of the smartphone device 101-1.

The location and MAC address of each of the detected BLE tags 102-1 and 102-2 may be temporarily stored in, for example, the smartphone device 101-1 in a form of a table. The location information and MAC address of the detected BLE tags 102-1 and 102-2 may be deleted from the smartphone device 101-1 immediately after the smartphone device 101-1 sends such information to a server 104. Alternatively, for example, the smartphone device 101-1 may keep such information stored for a predetermined number of days (i.e., after the smartphone device 101-1 sends such information to the server 104) so that the server 104 can retrieve such information at a future time (i.e., within the predetermined number of days).

A user of a smartphone device can register MAC addresses of BLE tags corresponding to the user's smartphone device on the server 104. In other words, a user of a smartphone device can register multiple BLE tags (each BLE tag given to a single person) that correspond to user's phone number so that the user can retrieve location information regarding the registered BLE tags at any future time from the server 104 or via database 105. This way, the server 104 "knows" the BLE tags that are associated with a certain smartphone device (or a plurality of smartphone devices) and accordingly, can authenticate the smartphone device and send location information of the registered BLE tags (associated with the smartphone device) to the smartphone device in response to a request from the smartphone device.

Additionally, the user of the smartphone device can also store names of people corresponding to each of the BLE tags that are associated with the smartphone device in the smartphone device and register the names corresponding to each of the BLE tags at the server 104. For example, in a family of four, a user can register MAC addresses of the four BLE tags (each tag corresponding to a single family member), names of family members corresponding to each of the BLE tags, and store such information in the smartphone device. As noted above, this information can also be transmitted to and registered at the server 104 at a request from the user or can be retrieved by the server 104 through a query from the server 104. Although the registered BLE tags corresponding to each of the smartphone devices 101-1, 102-1, and 103-1 is not depicted in FIG. 1, it should be understood that any of the depicted BLE tags 102-1, 102-2, 102-3, 102-4, 102-5, and 102-6 or other BLE tags that are not depicted in FIG. 1 could be associated with any of the smartphone devices 101-1, 102-1, and 103-1.

Further, in a non-limiting embodiment of FIG. 1, the server 104 and/or database 105 can store several kinds of information received from the smartphone devices 101-1, 101-2, and 101-3. They include, but are not limited to, MAC addresses of BLE tags 102-1, 102-2, 102-3, 102-4, 102-5, and 102-6, names of people corresponding to the MAC addresses associated with the BLE tags 102-1, 102-2, 102-3, 102-4, 102-5, and 102-6, information regarding smartphone devices associated with the BLE tags 102-1, 102-2, 102-3, 102-4, 102-5, and 102-6, date and time of detection of the BLE tags 102-1, 102-2, 102-3, 102-4, 102-5, and 102-6, location information of the BLE tags 102-1, 102-2, 102-3, 102-4, 102-5, and 102-6 for each date and time, location information of a smartphone device that detected the BLE tags 102-1, 102-2, 102-3, 102-4, 102-5, and 102-6, and information regarding smartphone devices that detect BLE tags 102-1, 102-2, 102-3, 102-4, 102-5, and 102-6. In addition to names of people, the server 104 and/or database 105 can also store other information identifying people including, but not limited to, address of a person, sex of the person, or any other information that can be used to identify a person corresponding to a BLE tag.

In one embodiment, the server 104 and/or database 105 receives and stores information during two separate instances. First, initially when a user downloads the application on to his/her smartphone device and registers for the BLE tags detection service, the user inputs names of people corresponding to each of the BLE tags (each of which has a unique MAC address) and registers the names of people and MAC addresses associated with the BLE tags assigned to each person at the server 104 by sending the information via a network 103. Alternatively, the server 104 queries such information from the smartphone device 101-1, for example, via the network 103. Second, when a smartphone device 101-1 detects BLE tags, for example, 102-1 and 102-2, the smartphone device 101-1 identifies a MAC address corresponding to each of the detected BLE tags 102-1 and 102-2 and sends the MAC addresses to the server 104 along with other information including, but not limited to, location of the detected BLE tags 102-1 and 102-2 via the network 103. Alternatively, the server 104 queries this information from the smartphone device 101-1 via the network 103.

Accordingly, by initially receiving information corresponding to BLE tags 102-1 and 102-2 (such as, but not limited to, names of the people to which the BLE tags 102-1 and 102-2 are assigned, MAC addresses of each of the BLE tags 102-1 and 102-2, and information regarding a smartphone device that registers the BLE tags 102-1 and 102-2), the server 104 can correlate and compare such information with information received from, for example, a smartphone device 101-1 when the smartphone device 101-1 detects BLE tags 102-1 and 102-2.

For example, Table 1 illustrates the information that the server 104 and/or database 105 stores based on user registration of BLE tags and based on detected BLE tags.

device corresponding to the BLE tag, and initial location (including date and time) of the BLE tag from a user during an initial registration process of the BLE tag via the downloaded application on a user's smartphone device. Subsequently, when BLE tags are detected by smartphone devices, the server 104 receives location information of the detected BLE tags (last detected location, second to last detected location, third to last detected location), including the date and time of such detection. It should be noted that the MAC address of a BLE tag, name of the person corresponding to the BLE tag, information regarding a smartphone device corresponding to the BLE tag, and initial location (including date and time) of the BLE tag may be received by the server 104 after the detection of the BLE tag. In other words, in an alternative embodiment, a user may register the BLE tags with the server 104 after the server 104 has received location information regarding BLE tags that have been detected by another smartphone device.

Although certain information is illustrated in Table 1, it should be noted that other information such as, but not limited to, sex of the person, address of the person may be included as identifying information of the person corresponding to a BLE tag. Additionally, the above table can include a number of smartphone devices that detect a particular BLE tag and include information regarding the smartphone devices that detects a particular BLE tag. For example, a location of a particular BLE tag may be located by multiple smartphone devices. Such information regarding the number of smartphone devices that detect a particular location of a BLE tag can be included in the table. This information will help confirm the location of a particular BLE tag by multiple smartphone devices. Further, specific information of the smartphone device (for e.g., the phone number associated with the smartphone device) can also be included in the table to identify the smartphone devices that detect a particular BLE tag.

The location information of BLE tags illustrated in Table 1 may include multiple locations (including a corresponding date and time for each detected location) detected by a smartphone device for each time the BLE tags are detected. For example, in a non-limiting embodiment of the present invention, the server 104 may store three of the most recent location information of a BLE tag (for example, last detected location, second to last detected location, and third to last detected

TABLE 1

| MAC address of BLE tag | Name of person | Smartphone device(s) corresponding to BLE tag | Initial Location, date and time | Third to last detected location, date and time | Second to last detected location, date and time | Last detected location, date and time |
|---|---|---|---|---|---|---|
| 000000001 | Hassan Samkari | 888-232 | 24° N, 46° E (Apr. 15, 2014 at 2:30 pm) | | | 20° N, 38° E (May 1, 2014 at 5:30 pm) |
| 000000002 | Rayyan Banjar | 888-232 | 24° N, 46° E (Apr. 15, 2014 at 2:30 pm) | | 22° N, 42° E (Apr. 18, 2014 at 10:00 pm) | 21° N, 36° E (Apr. 30, 2014 at 10:30 am) |
| 000000003 | Anas Basalamah | 886-444 and 884-332 | 21° N, 34° E (Mar. 1, 2014 at 1:00 pm) | | | |
| ... | ... | ... | ... | ... | ... | ... |
| ... | ... | ... | ... | ... | ... | ... |
| 999999999 | Razak Mohamed | 882-921 | 24° N, 39° E (Mar. 1, 2014 at 1:00 pm) | 21° N, 34° E (Mar. 10, 2014 at 9:00 pm) | 23° N, 37° E (Apr. 6, 2014 at 9:15 am) | 24° N. 39° E (Apr. 20, 2014 at 4:00 pm) |

In the above illustrated Table 1, the server 104 may receive a MAC address of a BLE tag, a name of the person corresponding to the BLE tag, information regarding a smartphone location) in order to be able to map a movement of the BLE tag based on the date and time the BLE tag is detected. Such a feature would be helpful to a user when a particular location of a BLE tag cannot be detected and the user may use past information to be able to track down an area in which the BLE tag may be located. For example, by knowing at least 3 previous detected locations of a BLE tag, the server 104 can identify multiple potential locations of the BLE tag. The server 104 can also take into account the time and date since a last detection to determine potential location of the BLE tag (in addition to taking into account the last detected location). Additionally, the server 104 can also take into account nearby highways or landmarks (i.e., near the previous detected locations of the BLE tags) in order to determine potential locations of the BLE tag. The server 104 can also create a map of potential locations of the BLE tag and send it to a user in response to a request for the latest location of the BLE tag from the user. The server 104 can constantly update the information stored in its database 105 based on updated information received from smartphone devices. Although the above-noted example in Table 1 illustrates 3 previously detected locations, it should be noted that the present invention is not limited thereto and that any number of previously detected locations may be stored in the server 104 and/or database 105.

In addition to having a user turn on/off the application, for example, on his/her smartphone device 101-1, the server 104 may control the application (i.e., turn on/off the application) in the smartphone device 101-1 if the user has previously agreed to allow the server 104 to do so. Control of the above-noted application on a user's smartphone device 101-1 may be helpful when the server 104 receives requests from different smartphone devices 101-2 or 101-3 to detect a particular BLE tag in a particular area (the particular area could be requested by a smartphone device or the server 104 may take into account the last detected location and time of a particular BLE tag). If the server 104 receives such a request, the server 104 may send a signal to a plurality of smartphone devices within the area of the request or within a vicinity of the last detected location of the particular BLE tag to turn on the application on the plurality of smartphone devices that are detected within the requested area or within a vicinity of the last detected location of the particular BLE tag. This would allow for a better search for a particular BLE tag and a missing person corresponding to the particular BLE tag may be identified in a fast and efficient manner while also saving power on smartphone devices. Further, once a predetermined number of smartphone devices (for example, 2) have detected a particular BLE tag, the server 104 may turn off the application on the plurality of smartphone devices to save power on these smartphone devices.

There are numerous ways in which the server 104 can detect locations of a plurality of smartphone devices. The server 104 may search for previously acquired locations of the plurality of smartphone devices on the database 105 that are within a certain distance from a location requested by a particular smartphone device to detect a particular BLE tag (or a certain distance from a location near the last detected location of the particular BLE tag). As noted above, the location information in Table 1 corresponds to a location of a smartphone device when the smartphone device detects a BLE tag. As such, since a BLE tag has a range of around 50 meters, one of ordinary skill in the art would understand that the location of the BLE tag is within about 50 meters from the location of the smartphone device that detects the BLE tag. Additionally, the server 104 may also search for smartphone devices in a particular location based on a date and time of the request received from a particular smartphone device. In addition to the location information, the table in the server 104 also stores the date and time of the detection of a BLE tag by a smartphone device. The date and time information can be used to determine location information of a smartphone device at a particular date and time.

Another way of locating the location of a plurality of smartphone devices may be to send a request signal to a plurality of smartphone devices (i.e., all the smartphone devices that have the application downloaded) requesting each of the smartphone devices to send a location update to the server 104. Based on such a location update, the server 104 can turn on/off the application on certain smartphone devices that are within a vicinity of the location request of the smartphone device that is requesting location information of a particular BLE tag (or within a vicinity of the last detected location of the particular BLE tag). This way, a particular BLE tag and a missing person corresponding to the particular BLE tag may be identified in a fast and efficient manner.

Figure 2:
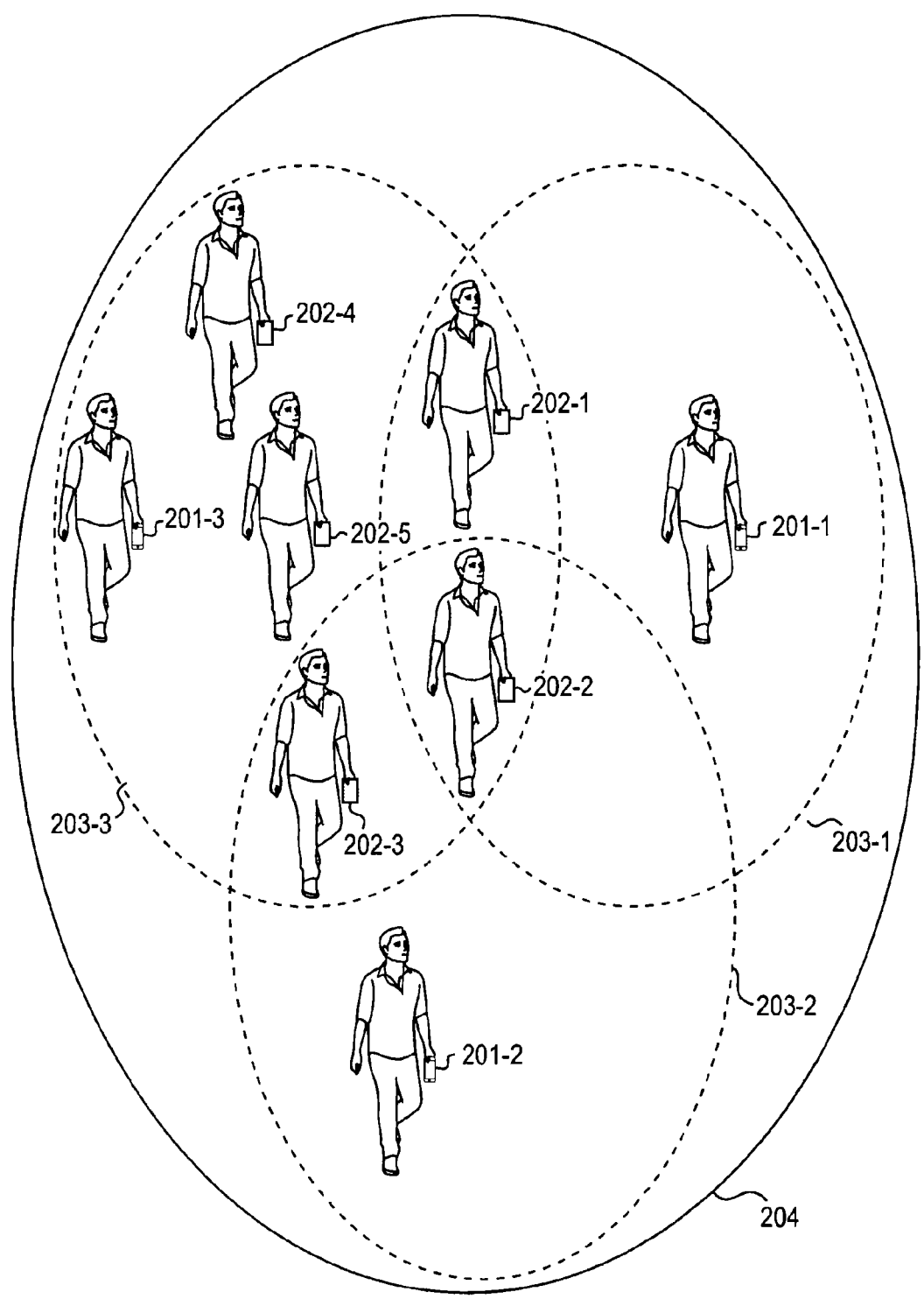
FIG. 2 illustrates an event with people with smartphone devices and BLE tags according to one example.

FIG. 2 illustrates a plurality of people carrying smartphone devices and a plurality of people carrying BLE tags. Although the non-limiting example in FIG. 2 describes a person carrying a BLE tag or a smartphone device, it should be understood that a person can carry both a BLE tag and a smartphone device.

Smartphone devices, such as 201-1, 201-2, and 201-3 can detect BLE tags 202-1, 202-2, 202-3, 202-4, and 202-5 within a detectable zone (such as within approximately a 50 meter radius from the smartphone devices 201-1, 201-2, and 201-3 shown in FIG. 2) and store a Media Access Control (MAC) address corresponding to each of the detected BLE tags 202-1, 202-2, 202-3, 202-4, and 202-5. As noted above, a smartphone device can typically detect BLE tags within approximately a 50 meter radius from the smartphone device (i.e., each BLE tag has the ability to transmit advertisement packets about 50 meters from the BLE tag as of the writing of this paper—however, future implementations of BLE tags may provide advertising at a greater distance). In other words, if a smartphone device detects an advertisement packet from a BLE tag, it is likely that the BLE tag is within approximately a 50 meter radius from the smartphone device. Again, it should be noted that a detectable zone of a smartphone device in exemplary embodiments of the present invention corresponds to a maximum distance a BLE tag can transmit an advertisement packet.

In FIG. 2, smartphone device 201-1 has a detectable zone 203-1 and such a detectable zone 203-1 includes BLE tags 202-1 and 202-2. Similarly, smartphone devices 201-2 and 201-3 have a detectable zones 203-2 and 203-3, respectively, which include BLE tags 202-1, 202-2, 202-3, 202-4, and 202-5.

The example shown in FIG. 2 describes an event 204 (such as a religious pilgrimage) including a plurality of BLE tags 202-1, 202-2, 202-3, 202-4, and 202-5 carried by people and a plurality of smartphone devices 201-1, 201-2, and 201-3 carried by people at the event 204. Although the non-limiting example in FIG. 2 illustrates smartphone devices 201-1, 201-2, and 201-3 inside the event 204, it should be understood that the smartphone devices 201-1, 201-2, and 201-3 may also be outside the event 204 and can detect BLE tags if the BLE tags are within respective detectable zones of the smartphone devices 201-1, 201-2, and 201-3.

Based on the movement of the plurality of BLE tags 202-1, 202-2, 202-3, 202-4, and 202-5 and the movement of the plurality of smartphone devices 201-1, 201-2, and 201-3, the BLE tags 202-1, 202-2, 202-3, 202-4, and 202-5 may move in and out of the detectable zone of the plurality of smartphone devices 201-1, 201-2, and 201-3. As noted above with regard to FIG. 1, smartphone devices 201-1, 201-2, and 201-3 store MAC addresses of the detected BLE tags and send the stored MAC addresses to the server 104 described in FIG. 1. It will be understood that the server 104 in FIG. 1 may query for MAC addresses at predetermined intervals of time instead of, for example, a smartphone device 201-1 constantly sending MAC addresses to the server 104. Such a feature would be helpful to save energy because a smartphone device such as 201-1 would not be required to send an update to the server 104 each time the smartphone device 201-1 detects a BLE tag within its detectable zone.

Figure 3:
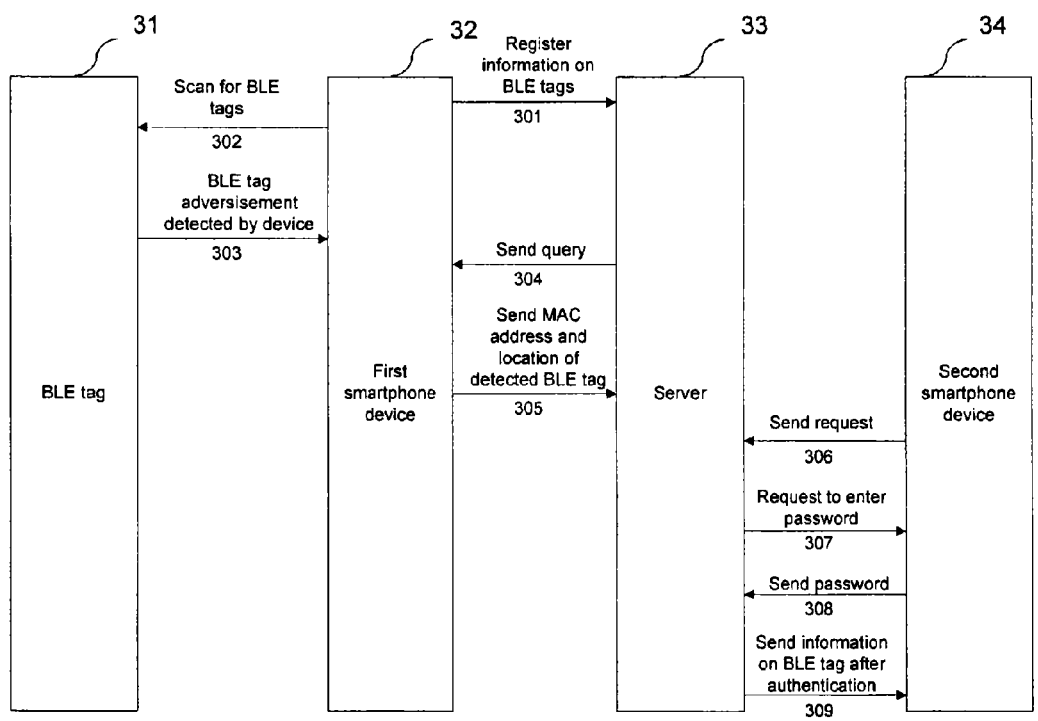
FIG. 3 is a diagram illustrating an exemplary method of the present invention according to one example.

FIG. 3 illustrates a communication between a BLE tag 31, a first smartphone device 32, a server 33, and a second smartphone device 34. It should be noted that BLE tag 31 may correspond to BLE tags 102-1, 102-2, 102-3, 102-4, 102-5, and 102-6 in FIG. 1, first and second smartphone devices 32 and 34 may correspond to smartphone devices 101-1, 101-2, and 101-3 in FIG. 1, server 33 may correspond to server 104 in FIG. 1.

In a non-limiting embodiment of the present invention a first smartphone device 32 registers one BLE tag or a plurality of BLE tags (each BLE tag having a unique MAC address) and their initial location (for example, using GPS) and sends such information to server 33 (Step 301). The information sent to the server 33 also includes information regarding the smartphone device 32 so as to be able to correlate the smartphone device 32 to the BLE tags registered using the smartphone device 32. Further, the information sent to server 33 can also include names of people associated with the one BLE tag or the plurality of BLE tags registered at the server 33. The server 33 accordingly stores such information in its database. Alternatively, as noted with regard to FIG. 1, server 33 may query such information from the first smartphone device 32.

Once the first smartphone device 32 registers BLE tags with the server 33 (i.e., after downloading the application on the smartphone device 32), a user of the first smartphone device 32 may turn on a feature to scan for BLE tags within a detectable zone of the smartphone device 32 (Step 302). If the BLE tag 31 is within a detectable zone of the first smartphone device 32, the first smartphone device 32 will recognize the advertisement packets of the BLE tag 31 and identify the MAC address correspond to the BLE tag 31 (Step 303). The first smartphone device can 32 either sends the MAC address of the detected BLE tag 31 along with a detected location of the BLE tag 31 to the server 33 (Step 305) or wait for a query from the server 33 (Step 304) prior to sending the MAC address of the detected BLE tag 31 along with a detected location of the BLE tag 31 to the server 33. The first smartphone device 32 may be configured to send the detected BLE tags each time a BLE tag is detected or may be configured to send the detected BLE tags at predetermined time intervals (for example, once every hour, once a day, or once a week). Similarly, the server 33 can also be configured to query a smartphone device for information on detected BLE tags at predetermined time intervals (for example, once an hour, once a day, or once a week). The server 33 then stores such information received from the first smartphone device 32 into its database (see Table 1 above). Although the above description indicates only a first smartphone device 32 communicating with the server 33, it should be understood that a plurality of smartphone devices (see FIG. 1) can communicate with the server 33 and perform similar functions described above in FIG. 1 with regard to smartphone devices 101-1, 101-2, and 101-3.

Additionally, the server 33 may receive a request from a second smartphone device 34 for information regarding a particular BLE tag (Step 306). Once the server 33 receives such a request, the server 33 determines whether or not it has information regarding the particular BLE tag. If the server determines that it has information regarding the particular BLE tag, the server 33 then determines whether or not the second smartphone device 34 is authorized to receive information regarding that particular BLE tag. Authentication of the second smartphone device 34 can be performed in several ways. Description of a couple of authentication methods are described below, but it should be understood that any other known method of authentication can be performed as would be understood by one of ordinary skill in the art.

First, when a request is received from the second smartphone device 34, the server 33 can search its database to determine whether the second smartphone device 34 has been registered and if so, whether the second smartphone device 34 has registered a particular BLE tag requested by the second smartphone device 34. If the server 33 determines that the second smartphone device 34 has registered that particular BLE tag, then the server 33 sends information regarding the BLE tag to the second smartphone device 34 (Step 309). Alternatively, in response to a request from the second smartphone device 34, the server 33 may request the second smartphone device 34 for a password prior to sending information regarding the particular BLE tag requested by the second smartphone device 34 (Steps 307, 308 and 309).

Figure 4:
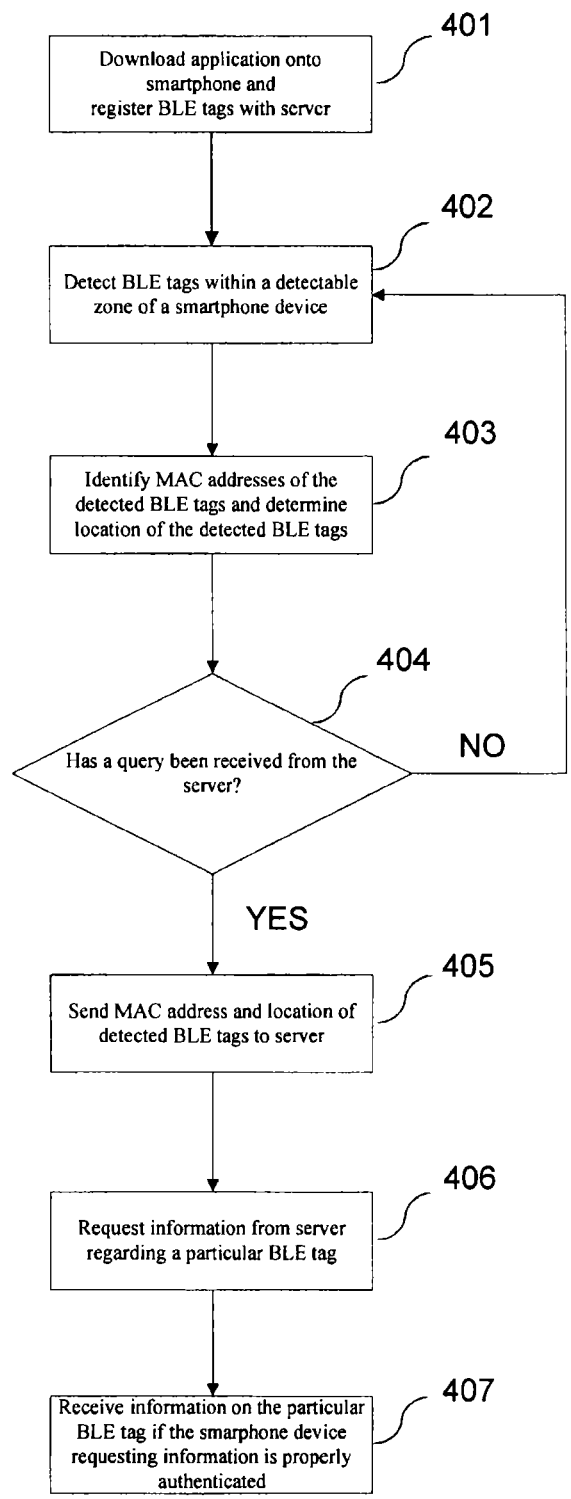
FIG. 4 is a flowchart of an exemplary method implemented by a smartphone device according to one example.

FIG. 4 illustrates a non-limiting example of a tracking method used by a smartphone device (for example, smartphone devices 101-1, 101-2, and 101-3 illustrated in FIG. 1). In Step 401, a smartphone device registers a BLE tag or a plurality of BLE tags with the server. As noted above with regard to FIG. 1, each of the BLE tags 102-1, 102-2, 102-3, 102-4, 102-5, and 102-6 has its own unique MAC address and accordingly, a smartphone device registers the MAC addresses corresponding to each of the BLE tags in the server, information regarding the corresponding smartphone device, and names of people corresponding to each of the BLE tags. The registration process also includes the smartphone device downloading an application and turning on the feature to detect BLE tags (as noted in the description with respect to FIG. 1, the feature to detect a BLE tag can be turned on by a server as well).

In Step 402, the smartphone device detects BLE tags within a detectable zone of the smartphone device. As indicated in FIG. 1, the BLE tags advertise themselves at predetermined intervals by transmitting advertisement packets containing MAC addresses. The smartphone device is configured to detect a plurality BLE tags and identify the MAC addresses corresponding to the each of the BLE tags (Step 403). Additionally, the smartphone device is also configured to determine the location of the BLE tags using, for example, GPS (Step 403). The location of the BLE tags, the MAC address of the BLE tags, the date and time of detection of the BLE tags may be temporarily stored in the smartphone device (Step 403).

In Step 404, the smartphone device determines whether or not it has received a query from the server. If the smartphone device determines that it has not received a query from the server, the smartphone device goes back to Step 402. However, if the smartphone device determines that it has received a query from the server, the smartphone device sends the MAC address corresponding to each detected BLE tag, location information corresponding to each detected BLE tag, date and time corresponding to each detected BLE tag to the server, and information regarding the smartphone device (for e.g., phone number corresponding to the smartphone device) (Step 405). Alternatively, as noted above in the description with regard to FIG. 1, a smartphone device does not wait for a query from a server and may upload the MAC address corresponding to each detected BLE tag, location information corresponding to each detected BLE tag, date and time corresponding to each detected BLE tag, and information regarding the smartphone device at predetermined time intervals (for example, once a day or once a week) or at intervals determined by the user of the smartphone device.

Steps 406 and 407 may be performed by any smartphone device and it does not necessarily need to be performed after Steps 401 to 405. In Step 406, a smartphone device requests for information regarding a particular BLE tag (the information could be any information listed in Table 1 or any other information reasonably identifying the particular BLE tag or information regarding the smartphone device detecting the particular BLE tag). In Step 407, the smartphone device receives information regarding a particular BLE tag if the smartphone device is properly authenticated by the server. The authentication methods by the server are described with regard to FIG. 3 above.

Figure 5:
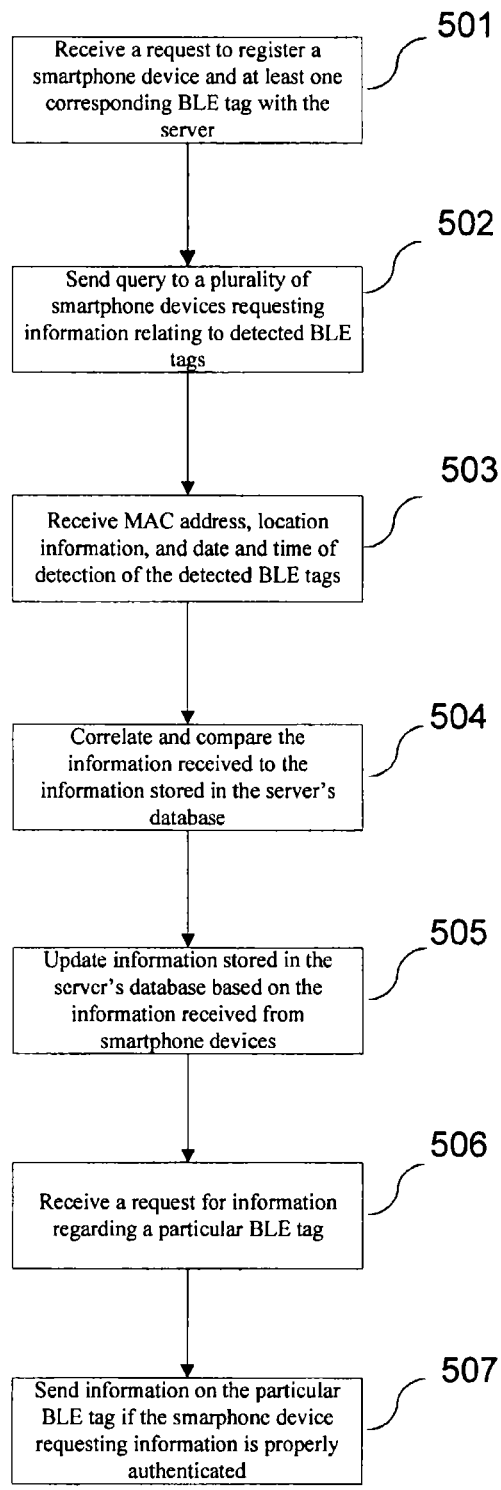
FIG. 5 is a flowchart of an exemplary method implemented by a server according to one example.

FIG. 5 illustrates a non-limiting example of a tracking method by a server (which includes a database) connected to a plurality of smartphone devices via a network. In Step 501, the server receives a registration request from a smartphone device (or a plurality of smartphone devices). The registration request, as noted in the description of FIG. 1, is a request from a smartphone device to register one BLE tag or a plurality of BLE tags corresponding to the smartphone device. The registration information may also include names of people corresponding to the BLE tags that are to be registered in the server. A registration request from a smartphone device can be received at any time and does not necessarily have to be the first step.

In Step 502, the server sends a query to a plurality of smartphone devices to send information regarding detected BLE tags. Such information may include, but is not limited to, the MAC address corresponding to each detected BLE tag, location information corresponding to each detected BLE tag, date and time corresponding to each detected BLE tag, and information regarding the smartphone devices that detect a particular BLE tag. Once this information is received (Step 503), the server correlates and compares this information with the information already stored in the server's database (Step 504). For example, referring to Table 1, if a BLE tag corresponding to MAC address 000000001 was stored in the database with an initial location of 24° N, 46° E on Apr. 15, 2014 at 2:30 pm, and the same BLE tag corresponding to MAC address 000000001 was detected by another smartphone device, the server stores the updated location, date and time information regarding the detected BLE tag. That is, referring to Table 1, the BLE tag corresponding to MAC address 000000001 was last detected at 20° N, 38° E on May 1, 2014 at 5:30 pm and this information is stored in the server's database. Accordingly, the server correlates and compares the received MAC addresses of BLE tags to MAC addresses stored in the server's database, and updates location information of a particular BLE tag based on the information received from a smartphone device regarding the particular BLE tag (Step 504).

In an alternative embodiment of the present invention, the present invention may require a plurality of smartphone devices (for e.g., 2) to detect a particular BLE tag and send information to the server before Table 1 updates the location information of that particular BLE tag. For example, referring to Table 1, if a BLE tag corresponding to MAC address 000000001 was stored in the database with an initial location of 24° N, 46° E on Apr. 15, 2014 at 2:30 pm, and the same BLE tag corresponding to MAC address 000000001 was detected by a plurality of smartphone devices, the server stores the updated location, date and time information regarding the detected BLE tag.

Further, the present invention may also require a current detected location of a particular BLE tag to be different by a predetermined amount from a last detected location of the same BLE tag prior to updating location information of the BLE tag in Table 1. For example, if a BLE tag corresponding to MAC address 000000001 was stored in the database 105 with an initial location of 24° N, 46.56° E on Apr. 15, 2014 at 2:30 pm and was subsequently detected around 24° N, 46.55° E on another date and time, Table 1 may not update the location since the subsequent location is within a predetermined amount. The predetermined amount (i.e., a predetermined difference in distance) may be set to any value that is considered to be suitable. Although Table 1 may not update the location information of the BLE tag since the subsequently detected location of the BLE tag is within a predetermined amount, Table 1 may update the date and time of the subsequent detection. This way Table 1 can store the most up to date information regarding a BLE tag.

In Step 505, the server updates location information of a particular BLE tag based on the location information received from a smartphone device corresponding to that particular BLE tag. For example, if the BLE tag corresponding to MAC address 000000001 in Table 1 was detected again by a smartphone device, then the location of the BLE tag corresponding to MAC address 000000001 will be updated in the server's database as the last detected location (along with the date and time of detection) and the previous last location of the BLE tag corresponding to MAC address 000000001 will be updated as the second to last detected location (including the date and time of the second to last detection).

Steps 506 and 507 may be performed by the server before or after Steps 501 to 505. In Step 506, the server may receive a request from any smartphone device regarding information about a particular BLE tag (the information could be any information listed in Table 1 or any other information reasonably identifying the particular BLE tag). In response to the request from a smartphone device, the server sends information regarding the particular BLE tag if the smartphone device is properly authenticated by the server. The authentication methods of the server are described with regard to FIG. 3 above.

Figure 6:
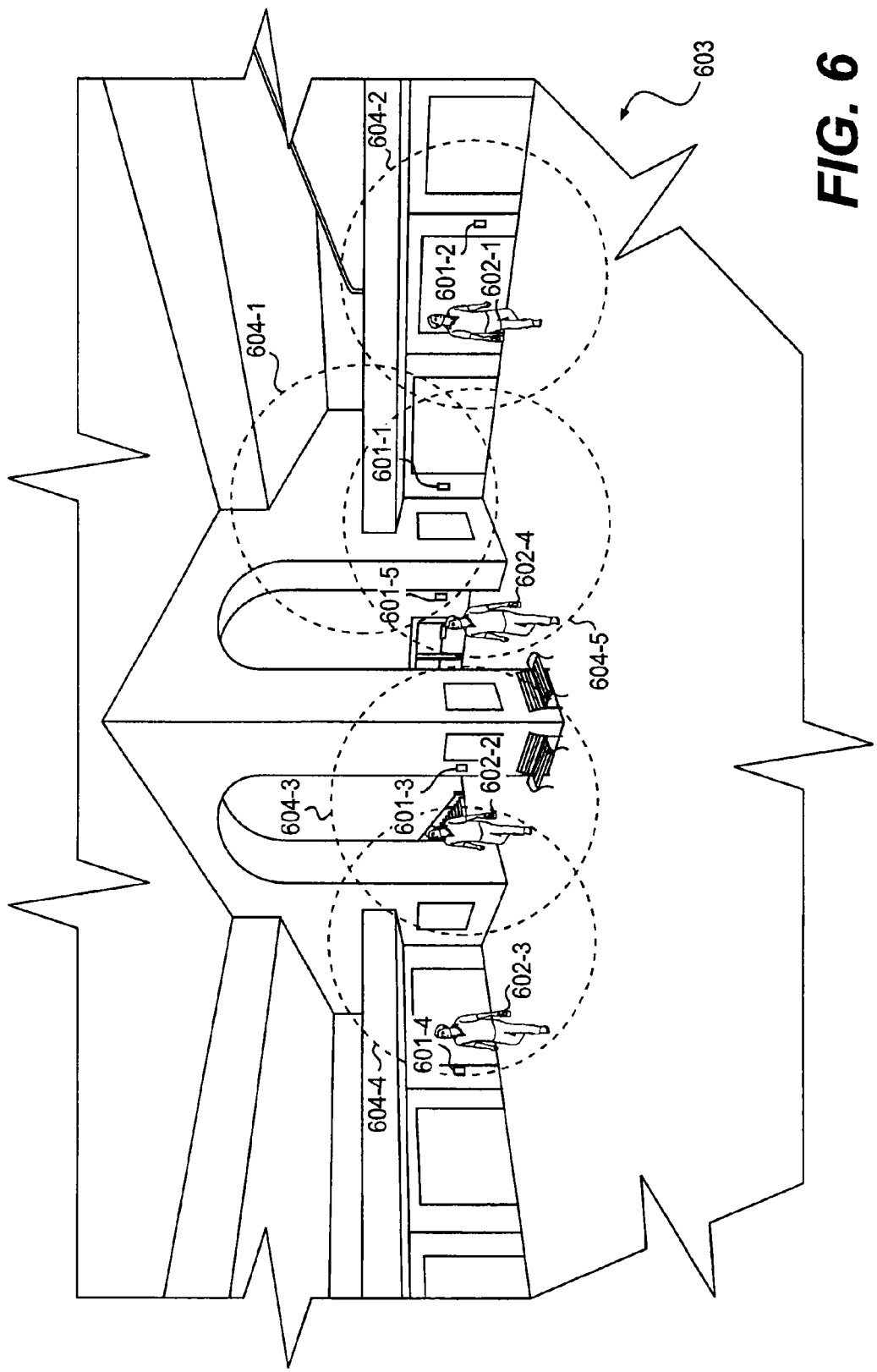
FIG. 6 illustrates another exemplary embodiment of the present invention with multiple reading devices according to one example.

FIG. 6 illustrates an exemplary embodiment of the present invention. In the exemplary embodiment illustrated in FIG. 6, a plurality of reading devices 601-1, 601-2, 601-3, 601-4, and 601-5 (having respective detectable zones 604-1, 604-2, 604-3, 604-4, and 604-5) are placed, for example, in a mall 603 to detect advertisements from a plurality of BLE tags 602-1, 602-2, 602-3, and 602-4. It should be understood that the plurality of reading devices 601-1, 601-2, 601-3, 601-4, and 601-5 may be placed in other locations to read advertisement packets from the plurality of BLE tags 602-1, 602-2, 602-3, and 602-4. Additionally, it is noted that the plurality of reading devices 601-1, 601-2, 601-3, 601-4, and 601-5 function similar to the plurality of smartphone devices 101-1, 101-2, and 101-3 described in FIGS. 1 to 5 and therefore, a detailed description of the plurality of reading devices 601-1, 601-2, 601-3, 601-4, and 601-5 is not provided.

Figure 7:
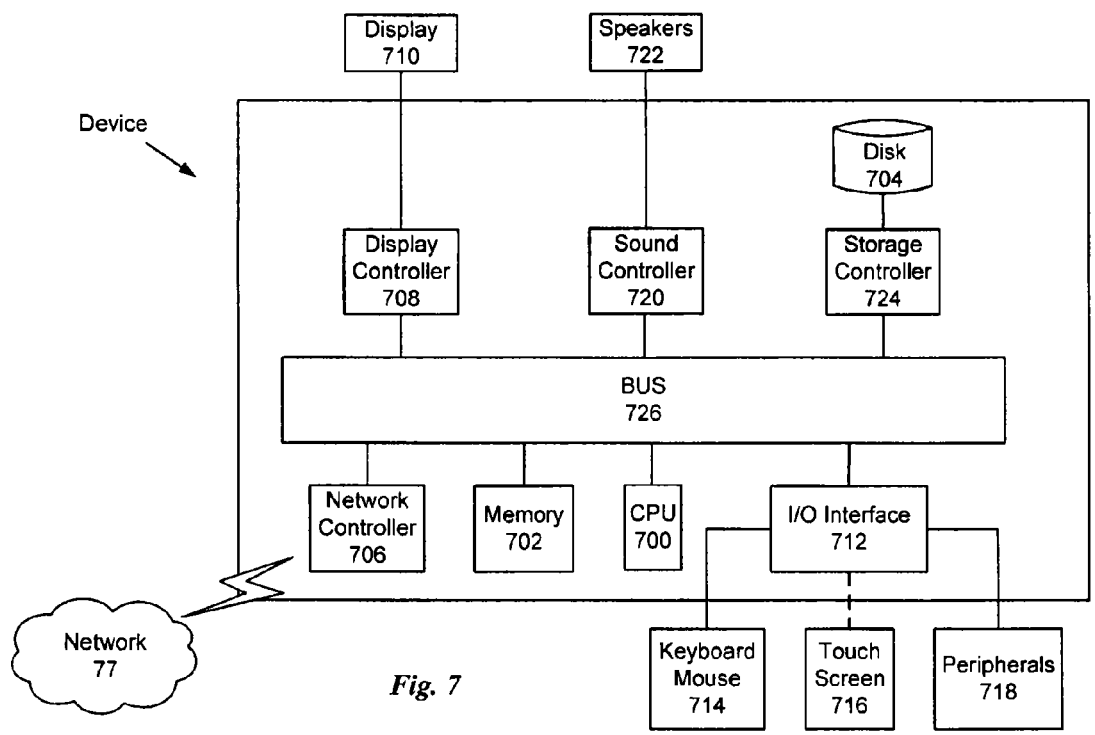
FIG. 7 is a block diagram of an exemplary computer system according to one example.

Next, a hardware description of a device according to exemplary implementations is described with reference to FIG. 7. The structure of the device illustrated in FIG. 7 is exemplary of a smartphone device, a reading device or another device including a computer or server as mentioned herein. Although the specific description provided below regarding FIG. 7 specifically pertains to a smartphone device, a reading device, and a server, it should be appreciated that corresponding structures or components can be provided in the other devices discussed herein, and not all of the components or connections illustrated in FIG. 7 may be provided in particular devices.

In FIG. 7, the device includes a CPU 700 which performs/executes the processes and algorithms described herein. Process data and instructions may be stored in memory 702. Processes and instructions may also be stored on a storage medium disk 704 such as a hard drive (HDD) or portable storage medium or may be stored remotely. Further, executable instructions are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, executable instructions may be provided as a utility application, background daemon, or component of an operating system, or combination thereof, executing in conjunction with CPU 700 and an operating system such as Android, iOS, Windows Mobile, Windows Phone, Microsoft Windows 7 or 8, UNIX, Solaris, LINUX, Apple MAC-OS and other operating systems.

CPU 700 may be a Xenon or Core processor from Intel of America or an Opteron processor from AMD of America, especially in implementations where the device is a computer or a server. Other processors can be utilized when the device is, e.g., a mobile phone, a smartphone, a tablet, a battery-operated device, or a portable computing device. For example, a Qualcomm Snapdragon or ARM-based processor can be utilized. The CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the processes described above, and the CPU 700 may incorporate processing circuitry other than generic processing circuitry, whereby the CPU 700 includes circuitry to execute specific display and user interface controls that may otherwise be provided for by other discrete circuitry.

The device in FIG. 7 also includes a network controller 706, such as an Intel Ethernet PRO network interface card from Intel Corporation of America, for interfacing with network 77 when the device is a computer or a server, for example. When the device is a portable electronic device, the network controller 706 includes a radio that may be incorporated into the CPU 700. The radio may incorporate various wireless communication technologies as separate circuits or shared circuitry, and the technologies can incorporate LTE, GSM, CDMA, WiFi, Bluetooth, NFC, infrared, FM radio, AM radio, ultrasonic, and/or RFID circuitry. The network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The network 77 may be connected to server 740 to retrieve a list of classroom registration and/or allow the device to download and install application software to implement aspects of this disclosure. The wireless network can also be WiFi, Bluetooth, or any other wireless form of communication. In the exemplary implementations discussed herein, the network 77 can include both the Internet and a Bluetooth communication channel, but this is not limiting as other combinations are applicable when a different short-range communication technology is utilized.

The device further includes, when the device is a computer or a server, a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners. When the device is, e.g., a smartphone, the display 710 can be integrated into the device and can be a touchscreen display. Further, the display controller 708 can be incorporated into the CPU 700.

A sound controller 720 is also provided in the device, such as Sound Blaster X-Fi Titanium from Creative, to interface with speakers/microphone 722 thereby providing sounds and/or music. The sound controller 720 can also be incorporated into the CPU 700 when the device is, e.g., a smartphone.

The general purpose storage controller 724 connects the storage medium disk 704 with communication bus 726, which may be an ISA, EISA, VESA, PCI, or similar, for interconnecting all or some of the components of the device. A description of the general features and functionality of the display 710, keyboard and/or mouse 714, as well as the display controller 708, storage controller 724, network controller 706, sound controller 720, and general purpose I/O interface 712 is omitted herein for brevity.

Although the description and discussion were in reference to certain exemplary embodiments of the present disclosure, numerous additions, modifications and variations will be readily apparent to those skilled in the art. The scope of the invention is given by the following claims, rather than the preceding description, and all additions, modifications, variations and equivalents that fall within the range of the stated claims are intended to be embraced therein.

Thus, the foregoing discussion discloses and describes merely exemplary implementations. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Exemplary Implementations

A. A location tracking method, the method comprising:

receiving, by at least one server, a first list of identification information and a first list of location information corresponding to a first set of a plurality of detected wireless electronic tags detected by a first device, the first set of the plurality of detected wireless electronic tags being within a detectable zone of the first device;

comparing, by the at least one server, a second list of identification information of a second set of a plurality of electronic wireless tags and the first list of identification information of the first set of the plurality of detected wireless electronic tags and updating a second list of location information corresponding to the second set of the plurality of electronic wireless tags based on the first list of identification information and the first list of location information of the first set of the plurality of detected wireless electronic tags;

receiving, at the at least one server, a request from a second device regarding a first location information of a first electronic wireless tag having a first identification information;

determining, at the least one server, whether the first identification information is included in the second list of identification information; and transmitting, from the at least one server to the second device based on said determining that the first identification information is included in the second list of identification information, the first location information of the first electronic wireless tag.

B. The method according to A, wherein the second list of identification information of the second set of the plurality of electronic wireless tags includes a Media Access Control (MAC) address of each tag of the second set of the plurality of electronic wireless tags.

C. The method according to any of A to B, wherein the second list of location information includes a latitude and longitude of each tag of the second set of the plurality of electronic wireless tags.

D. The method according to any of A to C, wherein the second list of location information includes a date and time of detection of each tag of the second set of the plurality of electronic wireless tags.

E. The method according to any of A to D, wherein the second list of identification information of the second set of a plurality of electronic wireless tags is received by the at least one server from a plurality of devices.

F. The method according to any of A to E, wherein the second list of location information includes an initial location of registration of each tag of the second set of a plurality of electronic wireless tags.

G. The method according to any of A to F, wherein the second list of location information includes a latest detected location, a second to last detected location, and a third to last detected location for each tag of the second set of a plurality of electronic wireless tags.

H. The method according to any of A to G, further comprising:

identifying, by the first device, a date and time of detection of the first set of the plurality of detected wireless electronic tags; and transmitting, to the at least one server by the first device, the date and time of detection of the first set of the plurality of detected wireless electronic tags.

I. The method according to any of A to H, wherein the first list of identification information and the first list of location information corresponding to the first set of the plurality of detected wireless electronic tags detected by the first device are transmitted by the first device to the at least one server in response to a query by the at least one server.

J. The method according to any of A to I, wherein the at least one server sends the query to the first device at predetermined time intervals.

K. The method according to any of A to J, wherein location of each detected wireless electronic tag of the first set of the plurality of detected wireless electronic tags is identified based on a Global Positioning System (GPS).

L. The method according to any of A to K, wherein the first set of the plurality of detected wireless electronic tags and the second set of the plurality of wireless electronic tags correspond to Bluetooth Low Energy (BLE) tags.

M. A system to track location, the system comprising:

processing circuitry configured to:

receive a first list of identification information and a first list of location information corresponding to a first set of a plurality of detected wireless electronic tags detected by a first device, the first set of the plurality of detected wireless electronic tags being within a detectable zone of the first device;

compare a second list of identification information of a second set of a plurality of electronic wireless tags and the first list of identification information of the first set of the plurality of detected wireless electronic tags, and update a second list of location information corresponding to the second set of the plurality of electronic wireless tags based on the first list of identification information and the first list of location information of the first set of the plurality of detected wireless electronic tags;

receive a request from a second device regarding a first location information of a first electronic wireless tag having a first identification information;

determine whether the first identification information is included in the second list of identification information; and transmit to the second device based on said determination that the first identification information is included in the second list of identification information, the first location information of the first electronic wireless tag.

N. The system according to M, wherein the second list of identification information of the second set of the plurality of electronic wireless tags includes a Media Access Control (MAC) address of each tag of the second set of the plurality of electronic wireless tags.

O. The system according to any of M to N, wherein the second list of location information includes a latitude and longitude of each tag of the second set of the plurality of electronic wireless tags.

P. The system according to any of M to O, wherein the second list of location information includes a date and time of detection of each tag of the second set of the plurality of electronic wireless tags.

Q. The system according to any of M to P, wherein the second list of location information includes a latest detected location, a second to last detected location, and a third to last detected location for each tag of the second set of a plurality of electronic wireless tags.

R. The system according to any of M to Q, wherein the first list of identification information and the first list of location information corresponding to the first set of the plurality of detected wireless electronic tags detected by the first device is received by the processing circuitry from the first device in response to a query by the processing circuitry.

S. A device to track location, the device comprising:

processing circuitry configured to:

detect a first set of a plurality of wireless electronic tags, the first set of the plurality of detected wireless electronic tags being within a detectable zone of the circuitry;

identify and determine a first list of identification information and a first list of location information corresponding to the first set of a plurality of detected wireless electronic tags;

send to at least one server the first list of identification information and the first list of location information corresponding to the first set of a plurality of detected wireless electronic tags detected by the circuitry;

send a request to the at least one server regarding a first location information of a first electronic wireless tag having a first identification information; and receive, from the at least one server, the first location information of the first electronic wireless tag, the first location information of the first electronic wireless tag being received based on a determination that the first identification information of the first electronic wireless tag is included in a second list of identification information of a second set of a plurality of electronic wireless tags in the at least one server, the second list of identification information of the second set of the plurality of electronic wireless tags being updated based on the first list of identification information and the first list of location information corresponding to the first set of the plurality of detected wireless electronic tags.

T. The device according to S, wherein the processing circuitry is configured to:
identify a date and time of detection of the first set of the plurality of detected wireless electronic tags; and
transmit, to the at least one server, the date and time of detection of the first set of the plurality of detected wireless electronic tags.

The invention claimed is:
1. A location tracking method, the method comprising:
receiving, by at least one server, a first list of identification information and a first list of location information corresponding to a first set of a plurality of detected wireless electronic tags detected by a first device, the first set of the plurality of detected wireless electronic tags being within a detectable zone of the first device;
comparing, by the at least one server, a second list of identification information of a second set of a plurality of wireless electronic tags and the first list of identification information of the first set of the plurality of detected wireless electronic tags, and updating a second list of location information corresponding to the second set of the plurality of wireless electronic tags based on the first list of identification information and the first list of location information of the first set of the plurality of detected wireless electronic tags, wherein location information corresponding to a wireless electronic tag within the second list of location information is updated only when a subsequently detected location of the wireless electronic tag exceeds a predetermined distance from a previously detected location of the wireless electronic tag;
receiving, at the at least one server, a request from a second device regarding a first location information of a first wireless electronic tag having a first identification information;
determining, at the least one server, whether the first identification information is included in the second list of identification information; and
transmitting, from the at least one server to the second device based on said determining that the first identification information is included in the second list of identification information, the first location information of the first wireless electronic tag.

2. The method according to claim 1, wherein the second list of identification information of the second set of the plurality of wireless electronic tags includes a Media Access Control (MAC) address of each tag of the second set of the plurality of wireless electronic tags.

3. The method according to claim 1, wherein the second list of location information includes a latitude and longitude of each tag of the second set of the plurality of wireless electronic tags.

4. The method according to claim 1, wherein the second list of location information includes a date and time of detection of each tag of the second set of the plurality of wireless electronic tags.

5. The method according to claim 1, wherein the second list of identification information of the second set of the plurality of wireless electronic tags is received by the at least one server from a plurality of devices.

6. The method according to claim 1, wherein the second list of location information includes an initial location of registration of each tag of the second set of the plurality of wireless electronic tags.

7. The method according to claim 1, wherein the second list of location information includes a latest detected location, a second to last detected location, and a third to last detected location for each tag of the second set of the plurality of wireless electronic tags.

8. The method according to claim 1, further comprising:
identifying, by the first device, a date and time of detection of the first set of the plurality of detected wireless electronic tags;
transmitting, to the at least one server by the first device, the date and time of detection of the first set of the plurality of detected wireless electronic tags;
counting a number of devices that detect a particular wireless electronic tag at a particular location; and
storing the number of devices that detect the particular wireless electronic tag at the particular location in a database.

9. The method according to claim 1, wherein the first list of identification information and the first list of location information corresponding to the first set of the plurality of detected wireless electronic tags detected by the first device are transmitted by the first device to the at least one server in response to a query by the at least one server.

10. The method according to claim 9, wherein the at least one server sends the query to the first device at predetermined time intervals.

11. The method according to claim 1, wherein a corresponding location of each detected wireless electronic tag of the first set of the plurality of detected wireless electronic tags is identified based on a Global Positioning System (GPS).

12. The method according to claim 1, wherein the first set of the plurality of detected wireless electronic tags and the second set of the plurality of wireless electronic tags correspond to Bluetooth Low Energy (BLE) tags.

13. A system to track location, the system comprising:
processing circuitry configured to:
receive a first list of identification information and a first list of location information corresponding to a first set of a plurality of detected wireless electronic tags detected by a first device, the first set of the plurality of detected wireless electronic tags being within a detectable zone of the first device;
compare a second list of identification information of a second set of a plurality of wireless electronic tags and the first list of identification information of the first set of the plurality of detected wireless electronic tags, and update a second list of location information corresponding to the second set of the plurality of wireless electronic tags based on the first list of identification information and the first list of location information of the first set of the plurality of detected wireless electronic tags, wherein location information corresponding to a wireless electronic tag within the second list of location information is updated only when a subsequently detected location of the wireless electronic tag exceeds a predetermined distance from a previously detected location of the wireless electronic tag;
receive a request from a second device regarding a first location information of a first wireless electronic tag having a first identification information;
determine whether the first identification information is included in the second list of identification information; and transmit to the second device, based on said determination that the first identification information is included in the second list of identification information, the first location information of the first wireless electronic tag.

14. The system according to claim 13, wherein the second list of identification information of the second set of the plurality of wireless electronic tags includes a Media Access Control (MAC) address of each tag of the second set of the plurality of wireless electronic tags.

15. The system according to claim 13, wherein the second list of location information includes a latitude and longitude of each tag of the second set of the plurality of wireless electronic tags.

16. The system according to claim 13, wherein the second list of location information includes a date and time of detection of each tag of the second set of the plurality of wireless electronic tags.

17. The system according to claim 13, wherein the second list of location information includes a latest detected location, a second to last detected location, and a third to last detected location for each tag of the second set of the plurality of wireless electronic tags.

18. The system according to claim 13, wherein the first list of identification information and the first list of location information corresponding to the first set of the plurality of detected wireless electronic tags detected by the first device is received by the processing circuitry from the first device in response to a query by the processing circuitry.

19. A device to track location, the device comprising:
processing circuitry configured to:
detect a first set of a plurality of wireless electronic tags, the first set of the plurality of detected wireless electronic tags being within a detectable zone of the circuitry;
identify and determine a first list of identification information and a first list of location information corresponding to the first set of a plurality of detected wireless electronic tags;
send to at least one server the first list of identification information and the first list of location information corresponding to the first set of a plurality of detected wireless electronic tags detected by the circuitry;
send a request to the at least one server regarding a first location information of a first wireless electronic tag having a first identification information; and
receive, from the at least one server, the first location information of the first wireless electronic tag, the first location information of the first wireless electronic tag being received based on a determination that the first identification information of the first wireless electronic tag is included in a second list of identification information of a second set of a plurality of wireless electronic tags in the at least one server, the second list of identification information of the second set of the plurality of wireless electronic tags being updated based on the first list of identification information and the first list of location information corresponding to the first set of the plurality of detected wireless electronic tags, and location information corresponding to a wireless electronic tag within the second list of location information being updated only when a subsequently detected location of the wireless electronic tag exceeds a predetermined distance from a previously detected location of the wireless electronic tag.

20. The device according to claim 19, wherein the processing circuitry is configured to:
identify a date and time of detection of the first set of the plurality of detected wireless electronic tags; and
transmit, to the at least one server, the date and time of detection of the first set of the plurality of detected wireless electronic tags.

* * * * *